(12) United States Patent
Jeschke et al.

(10) Patent No.: US 8,555,405 B2
(45) Date of Patent: Oct. 8, 2013

(54) METHOD AND SYSTEM FOR THE AUTHORIZATION MANAGEMENT

(75) Inventors: Alexander Jeschke, Osterholz-Scharmbeck (DE); Ulrich Louis, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 871 days.

(21) Appl. No.: 12/035,301

(22) Filed: Feb. 21, 2008

(65) Prior Publication Data

US 2009/0013186 A1 Jan. 8, 2009

(30) Foreign Application Priority Data

Feb. 21, 2007 (DE) .................. 10 2007 008 948

(51) Int. Cl.
*G06F 7/04* (2006.01)
*G06F 17/30* (2006.01)
*H04N 7/16* (2011.01)
*H04L 29/06* (2006.01)

(52) U.S. Cl.
USPC ............... 726/27; 726/26; 726/30; 713/150

(58) Field of Classification Search
USPC ...... 713/170, 150; 726/26–30; 380/277–282
See application file for complete search history.

(56) References Cited

U.S. PATENT DOCUMENTS

| | | | |
|---|---|---|---|
| 6,684,389 B1 | 1/2004 | Tanaka et al. | |
| 6,873,853 B2 | 3/2005 | Kim | |
| 7,058,802 B1* | 6/2006 | Epstein et al. | 713/150 |
| 7,073,199 B1* | 7/2006 | Raley | 726/26 |
| 7,085,741 B2* | 8/2006 | Lao et al. | 705/51 |
| 7,210,165 B2 | 4/2007 | Speare et al. | |
| 2002/0120847 A1* | 8/2002 | Kamperman | 713/170 |
| 2002/0157002 A1* | 10/2002 | Messerges et al. | 713/155 |
| 2002/0184155 A1* | 12/2002 | Tayadon et al. | 705/51 |
| 2003/0163724 A1* | 8/2003 | Tayebi et al. | 713/200 |
| 2003/0195855 A1* | 10/2003 | Parks et al. | 705/51 |
| 2003/0200459 A1* | 10/2003 | Seeman | 713/200 |
| 2004/0205735 A1 | 10/2004 | Croix | |
| 2005/0182931 A1* | 8/2005 | Robert et al. | 713/168 |

FOREIGN PATENT DOCUMENTS

DE 10 2004 048 126 A1 4/2006

OTHER PUBLICATIONS

German Examiner's Report dated Dec. 8, 2009 (with English language machine translation).

(Continued)

*Primary Examiner* — Tae Kim

(74) *Attorney, Agent, or Firm* — Orrick Herrington & Sutcliffe, LLP

(57) ABSTRACT

A method is provided for the authorization management of digital contents between at least one owner of authorizations with a first electronic work environment and at least one user of the contents with a second electronic work environment. The owner of the authorizations provides the digital contents to the user of the contents by means of the first electronic work environment at a defined scope of authorizations and the user of the contents is entitled to use the provided digital contents on the second electronic work environment only at the defined scope of authorization. The digital contents are encoded with encryption, the encoded contents are exchanged between the first electronic work environment and the second electronic work environment and the encoded contents are subsequently decoded by means of decryption pertaining to the digital contents.

12 Claims, 4 Drawing Sheets

(56) References Cited

OTHER PUBLICATIONS

Digital Rights Management (DRM), Verfahren, die helfen Rechte an virtuellen Waren durchzusetzen, Vorlesung im Sommersemester 2006 von Privatdozent Dr.-Ing. habil Jürgen Nützel, Juergen. Nuetzel@tu-ilmenau.de an der Technischen Universität Ilmenau (an English translation is provided).

German Examiner's Report dated Oct. 23, 2007 and English Translation thereof.

Microsoft Windows Rights Management Services, Technical Overview of Windows Rights Management Services for Windows Server 2003, Microsoft Corporation, Published Nov. 2003, Updated Apr. 2005, pp. 1-25.

Universität Karlsruhe (TH), Institut für Telematik, Rechtemanagement in Verteilten Systemenmen mit Web-Services, Diplomarbeit am Institut für Telematik, Fakultät für Informatik, Universität Karlsruhe (TH), von, cand. infwirt., Christian Schwall, Tag der Anmeldung: May 15, 2005, Tag der Abgabe: Nov. 14, 2005 (with English language machine translation).

* cited by examiner

METHOD AND SYSTEM FOR THE AUTHORIZATION MANAGEMENT

This application claims priority to German Application No. 10 2007 008 948.3 entitled "Verfahren und System zur Rechteverwaltung" filed in the German Patent Office on Feb. 21, 2007, which is herein incorporated by reference.

The invention relates to a method for the authorization management of digital contents between at least one owner of authorizations with a first electronic work environment and a least one user of the contents with a second electronic work environment where the owner of the authorizations provides the digital contents to the user of the contents by means of the first electronic work environment at a certain scope of authorizations and where the user of the contents is entitled to use the provided digital contents on the second electronic work environment only at the defined scope of authorizations, where the digital contents are encoded with an encryption, the encoded contents are exchanged between the first electronic work environment and the second electronic work environment and the encoded contents are subsequently decoded to become digital contents by means of decryption. In addition, the invention relates to a corresponding system for the authorization management.

Methods for the authorization management have been known for some time in various technical fields and they represent a technical safety measure to provide the owner of the authorizations of digital contents with the option of the technical enforcement of the type of use of the digital contents by users of the contents, based on user agreements concluded beforehand.

The nature of the digital contents can vary, where the focus of the mentioned methods was mainly geared toward the protection of multimedia contents (music, movies, electronic books, language). The agreed scope of authorizations can also relate to various aspects of digital contents, including in general the protection of the exclusive access of the authorized user of the contents to the digital contents or the type of use of the digital contents by the user of the contents. Typical rights of use may consist for example of an unrestricted authorization, i.e. the option of using the digital contents at will; however, the right of use may be limited to the display of the digital contents, without the possibility of editing, saving or transferring the digital contents.

The known methods have in common that the scope of authorizations agreed between the owner of the authorizations and the user of the contents is linked to additional information to the digital contents, where the specified scope of authorizations to the digital contents is linked separately to these contents or is embedded into the digital contents (steganographic method). In addition to the encoded transmission of the digital contents which is also common in the known methods, additional—attached or embedded—digital information is required to identify the agreed scope of authorizations.

In accordance with one aspect of the invention, the method for the authorization management in the first electronic work environment and/or in the second electronic work environment is/are equipped with a reference list of scopes of authorizations and corresponding encryptions and/or decryptions. The first electronic work environment encodes the digital contents according to the encryption associated with the defined scope of authorizations. The encoded contents are decoded by means of suitable decryption in the second electronic work environment. The second electronic work environment only provides the digital contents to the user of the contents at the scope of authorizations corresponding to the decryption used.

In accordance with another aspect of the invention, no additional identification information hidden in the actual digital contents or attached to the actual digital contents are required to identify the scope of authorizations for accessing the digital contents to be granted to the user of the contents; in fact, the scope of authorizations is identified by the encryption and decryption of the digital contents. To be able to assign different scopes of authorizations to digital contents, an analogous number of corresponding encryptions and decryptions are used. In accordance with another aspect of the invention, the digital information corresponding to a defined scope of authorizations and encoded with encryption can only be decoded with the decryption by the user of the contents with the second electronic work environment which in turn corresponds to the scope of authorizations specified in the reference list. Only the decoding of encoded contents with the decryption corresponding to the agreed scope of authorizations will provide properly decoded digital contents on the second electronic work environment, where the second electronic work environment will recognize which decryption is associated with which scope of authorizations based on the reference list and will only provide the user of the contents with the digital contents within the respective scope of authorizations.

In accordance with a further aspect of the invention it is irrelevant whether the reference list is available both on the first electronic work environment of the owner of the authorizations as well as the second electronic work environment of the user of the contents, or whether the reference list is only available for example on the second electronic work environment of the user of the contents; the fundamental function of the method according to this aspect of invention, i.e. the identification of the scope of authorizations by means of corresponding encryptions and decryptions will not be altered.

In one embodiment of the invention, the reference list is recorded both on the first electronic work environment as well as on the second electronic work environment, and the simple notification from the user of the contents to the owner of the authorizations stating which digital contents and which scope of authorizations the user of the contents would like to acquire from the owner of the authorizations is sufficient. However, the user of the contents is not required to provide the owner of the authorizations with any information concerning the encryption he should use because the owner of the authorizations is in the possession of this information. In contrast, if the reference list is only recorded on the second electronic work environment, the user of the contents is required to provide the owner of the authorizations with the encryption that corresponds to the scope of the authorizations when requesting certain digital contents and a certain scope of authorizations in that the owner of the authorizations is informed of the required encryption or the owner of the authorizations acquires the corresponding encryption from the user of the contents.

In another embodiment of the invention, an asymmetrical method with private and public keys is used as encryption/decryption, where an encryption method such as RSA, which is based on the prime factorization according to the mathematicians Rivest, Shamir and Adleman is used, or any other alternative public/private key cryptography such Diffie-Hellman, El Gamul, elliptic curve, etc. In said asymmetrical encryption method the digital contents are encrypted by means of a public key which does not need to be kept secret and the encoded contents are decoded by means of the corresponding private key which is kept strictly secret. In other words, in this aspect of the invention the private key is known to the user of the contents and should preferably be known only to the user of the contents. An additional advantage of public/private key methods is that the user of the contents can authenticate himself to the owner of the authorizations by means of signed messages and the owner of the authorizations can request authenticated requests for the use of digital contents with a defined scope of authorizations from the user of the authorizations, thus making the system more safe overall.

In another embodiment of the invention, at least the decryption in the second work environment is concealed in an inaccessible way. For example, the decryption in the second electronic work environment or the software modules of the second electronic work environment is hidden, in particular, by means of computer based steganographic methods which prevent third parties—including the user of the contents—from accessing the decryption directly. This makes the unauthorized transfer of decryptions stored on the second electronic work environment more difficult.

In an additional exemplary embodiment of the invention, the second work environment is a graphic and/or mathematical modeling environment or the second work environment comprises a graphic and/or mathematical modeling environment. In a further embodiment, the digital contents are graphic and/or mathematical models or model components.

It should be noted that mathematical models and model components of technical physical processes represent a significant value and their protection is of particular interest because it is intellectual property that needs to be treated confidentially on the one hand and for commercial reasons on the other hand. Typical examples in this context comprise the models of combustion engines for motor vehicles as well as mathematical power train and running gear models for motor vehicles.

A significant amount of know-how is required for said models which may be of interest for users of these models at different authorization levels. For example, some users exclusively wish to use a provided mathematical model—which may be fully parameterized—for simulation purposes, without having any knowledge of the mathematical model itself, i.e. without being able to see, parameterize or modify the model. For other users it is very important to be able to change and update the content of the provided model and to save and transfer the modified model. Thus, in accordance with another aspect of the invention, the reference list comprises at least one of the following scopes of authorizations: unrestricted authorization, inheritance right, right of use, right to view and right to modify.

The scope of "unrestricted authorization" is not limited in any way and entitles the user of the contents to process, view and modify the provided digital contents and to use and transfer them as often as required. In accordance with another aspect of the invention, the inheritance right solely refers to the right to copy and transfer the digital contents and "right of use" refers to the right to use the digital contents in a defined manner without being able to view the digital contents in detail. With respect to an embodiment of the invention involving graphic and/or mathematical models as digital contents, this means that a model of an engine is only available as a "black box," is equipped with the required inputs and outputs and can be used for example for simulations within the scope of a modeling environment; in other words, the sole right of use does not grant the user of the contents any access to the design and structure of the digital contents. In contrast, the right to view enables the user of the contents to view the digital contents, but without being able to use them in a conventional manner. Again using the example of mathematical models, this means that the user of the contents is able to view the mathematical model but is unable to use it in a conventional manner within the scope of his own model, i.e. he is unable to perform a simulation using the mathematical model equipped with the sole right to view. Naturally, the described scopes of authorizations are combinable and certain scopes of authorizations automatically comprise other, more specific scopes of authorizations.

In accordance with a further aspect of the invention the first electronic work environment and/or the second electronic work environment is/are equipped with a reference list of scopes of authorizations and corresponding encryptions and/or decryptions, enabling the digital contents in the first electronic work environment to be encryptable by means of corresponding encryption and the encoded contents are decodable by means of suitable decryption using the second electronic work environment, where the digital contents on the second electronic work environment can only be used at the scope of authorizations corresponding to the decryption.

In accordance with another aspect of the invention, the identification of the scope of authorizations is no longer tied to additional identifying information that needs to be attached to the digital contents or embedded in the digital data; in fact the scope of authorizations at which the digital contents will be provided to the user of the contents is identified solely by the used encryption and the decryption itself. The second electronic work environment recognizes exactly the scope of authorizations at which the digital contents are to be made available to the user of the contents on the second electronic work environment based on the used decryption and based on the scope of authorizations defined in the reference list and corresponding to the decryption.

In accordance with another embodiment of the invention, the encryption on the first electronic work environment and the decryption on the second electronic work environment implement an asymmetric encryption and decryption using private and public keys, where the RSA method is preferably implemented, in which a pair of public and private keys corresponds to a defined scope of authorizations. The use of asymmetric encryption and decryption for the system for the authorization management at hand comprises the same properties and advantages described in connection with the method according to the invention for the authorization management described above. In accordance with another embodiment of the invention, the reference list is only recorded on the second electronic work environment, where the reference list contains the scope of authorizations and the corresponding public and private keys. In this embodiment of the invention the reference list and the encryptions and decryptions contained therein only need to be provided on one electronic work environment.

A plurality of possibilities exists on how to design and upgrade the method to manage the authorizations according to the invention. The embodiments described below are merely illustrative. Persons or ordinary skill in the art, will understand that the invention is capable of use in various other combinations and environments or modifications within the scope of the inventive concepts expressed herein.

Figure 1:
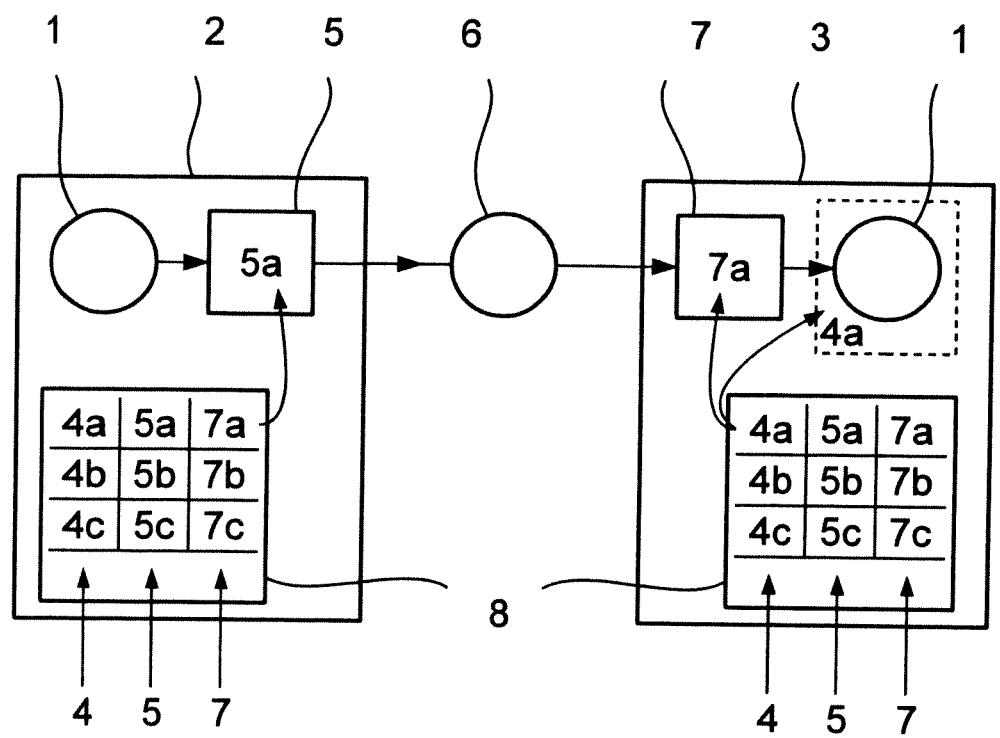
FIG. 1 shows a schematic illustration of an embodiment of the method and system of the invention.

FIG. 1 to FIG. 4 each illustrate both a method for the authorization management as well as a system for the authorization management. The method and system for the authorization management are designed for the authorization management of digital contents 1 between at least one owner of authorizations with a first electronic work environment 2 and at least one user of the contents with a second electronic work environment 3, where the owner of the authorizations provides the digital contents 1 to the user of the contents by means of the first electronic work environment 2 at a defined scope of authorizations 4. This means that the user of the contents can only use the provided digital contents 1 on the second electronic work environment 3 at the defined scope of authorizations 4, which was agreed between the owner of the authorizations and the user of the contents beforehand; in FIG. 1 and FIG. 2 this is indicated by the dashed border around the digital contents 1, labeled 4a. The digital contents 1 are encoded by means of encryption 5 on the first electronic work environment 2 and the encoded contents 6 resulting from the digital contents 1 are exchanged between the first electronic work environment 2 and the second electronic work environment 3, whereupon the encoded contents 6 are decoded again in the second electronic work environment 3 by means of decryption 7 pertaining to the digital contents 1, ensuring that the user of the contents can only use the digital contents 1 with the second electronic work environment 3 at the defined scope of authorizations 4.

With respect to the method for the authorization management according to FIG. 1, it is intended that the first electronic work environment 2 and the second electronic work environment 3 are equipped with a reference list 8 comprising the scope of authorizations 4 and the corresponding encryptions 5 and/or decryptions 7. This enables the first electronic work environment 2 to encode the digital contents 1 with the encryption 5 corresponding to the defined scope of authorizations 4 and the encoded contents 6 to be decoded in the second electronic work environment 2 by means of suitable decryption 7, where the second electronic work environment 3 provides the digital contents 1 to the user of the contents only at the scope of authorizations 4 corresponding to the decryption 7.

Figure 2:
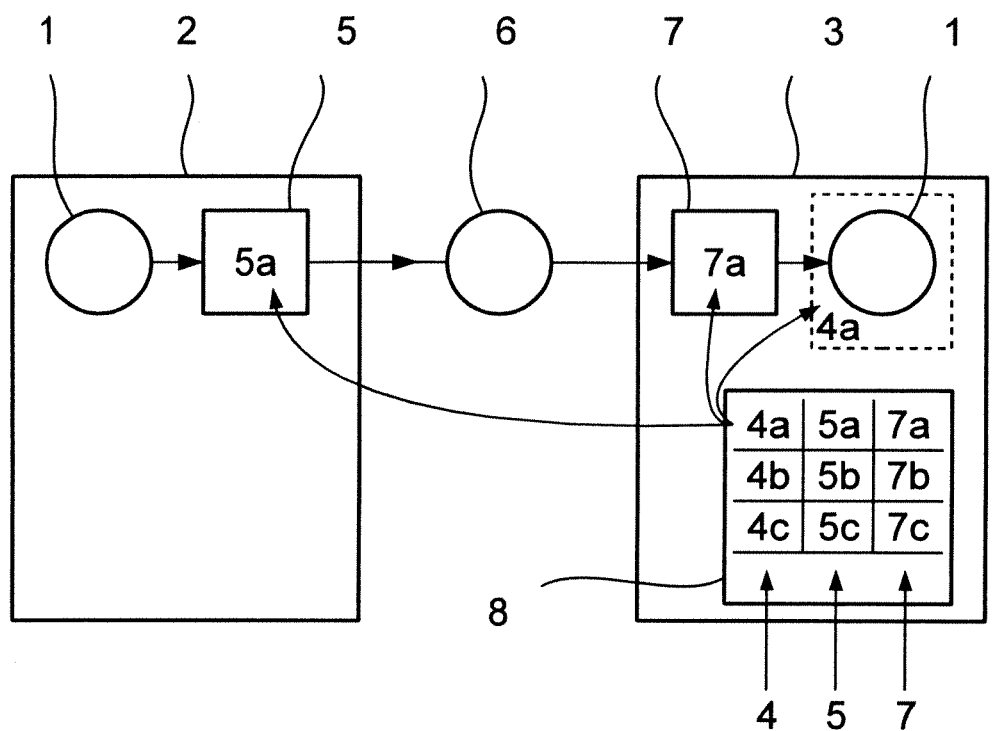
FIG. 2 shows an additional embodiment of the method and system of the invention and FIG. 3 shows an additional embodiment of the method of the invention.

In FIG. 1 and FIG. 2, the reference list 8 comprises of three references, i.e. a first reference referring to a first scope of authorizations 4a with a corresponding encryption 5a and decryption 7a corresponding to the encryption; a second reference referring to a second defined scope of authorizations 4b with the corresponding encryption 5b and decryption 7b corresponding to the latter encryption and a third reference, consisting of a third defined scope of authorizations 4c with a corresponding encryption 5c and the decryption 7c corresponding to the latter encryption.

In the exemplary embodiment illustrated in FIG. 1, the digital contents 1 at the disposal of the owner of the authorizations are intended to be provided from the first electronic work environment 2 of the owner of the authorizations at a scope of authorizations 4a to the second electronic work environment 3 of the user of the contents. In the mentioned and illustrated method and the illustrated system for the authorization management, the desired scope of authorizations 4a is not characterized by additional information about the scope of authorizations, but the defined scope of authorizations 4a is solely characterized by the selection of a defined encryption 5a and the corresponding decryption 7a. With respect to the exemplary embodiments illustrated in FIG. 1 and FIG. 2, this means that for the encryption 5 of the digital contents 1 in the first electronic work environment 2 the encryption 5a corresponding to the defined scope of authorizations 4a is used and its use results in the encrypted contents 6. Analogously, the encrypted contents 6 on the second work environment 3 of the user of the contents can only be decoded by means of the decryption 7a which corresponds to the previously selected encryption 5a.

The second electronic work environment 3 is aware of the decryption 7a to be used, either because it acquired the digital contents 1 itself from the first electronic work environment 2 of the owner of the authorizations based on the corresponding scope of authorizations 4a or because it was notified of the defined scope of authorizations 4a by the owner of the authorizations with the first electronic work environment 2 or because only the defined decryption 7a used for the encoded contents 6 results in a meaningful digital content 1 on the second electronic work environment 3. The second electronic work environment 3 then grants the user of the contents only access to the decoded digital contents 1 which correspond to the scope of authorizations 4a corresponding to the decryption 7a.

The method for the authorization management and the system for the authorization management illustrated in FIG. 2 differ from the one illustrated in FIG. 1 in that only the second electronic work environment 3 is equipped with the reference list 8, meaning that the reference list 8 does not have to be provided on the first electronic work environment 2 and the second electronic work environment 3. However, in this case it is necessary that the second electronic work environment 3 informs the first electronic work environment 2 of the defined encryption 5 which belongs to the desired defined scope of authorizations 4. In the exemplary embodiment according to FIG. 2, the user of the contents with the second electronic work environment 3 acquires the digital contents 1 on the first electronic work environment 2 at the defined scope of authorizations 4a which corresponds to encryption 5a; in other words, the second work environment 3 needs to notify the first electronic work environment 2 of the encryption 5a. The digital contents 1 with the encryption 5a are then encoded on the first electronic work environment 2, whereupon the method proceeds in the same manner and the system of the authorization management acts the same way as described above with respect to FIG. 1.

Moreover, the method for the authorization management illustrated in FIG. 1 to FIG. 4 as well as the system for the authorization management illustrated in FIG. 1 to FIG. 4 are characterized in that an asymmetrical method with private and public keys is used as encryption 5/decryption 7, where the RSA method by Rivest, Shamir, Adleman is used in the exemplary embodiments presented here. In this method, the public key is used to encrypt the digital contents 1, while the private key corresponding to the public key which is only known or should only be known to the user of the contents on the second electronic work environment 3, is used for the decryption 7 of the encoded contents 6 pertaining to the digital contents 1. In other words, the encryption 5 illustrated in the figures corresponds to the public keys and the decryption 7 illustrated in the figures corresponds to the private keys of the asymmetric method.

Figure 3:
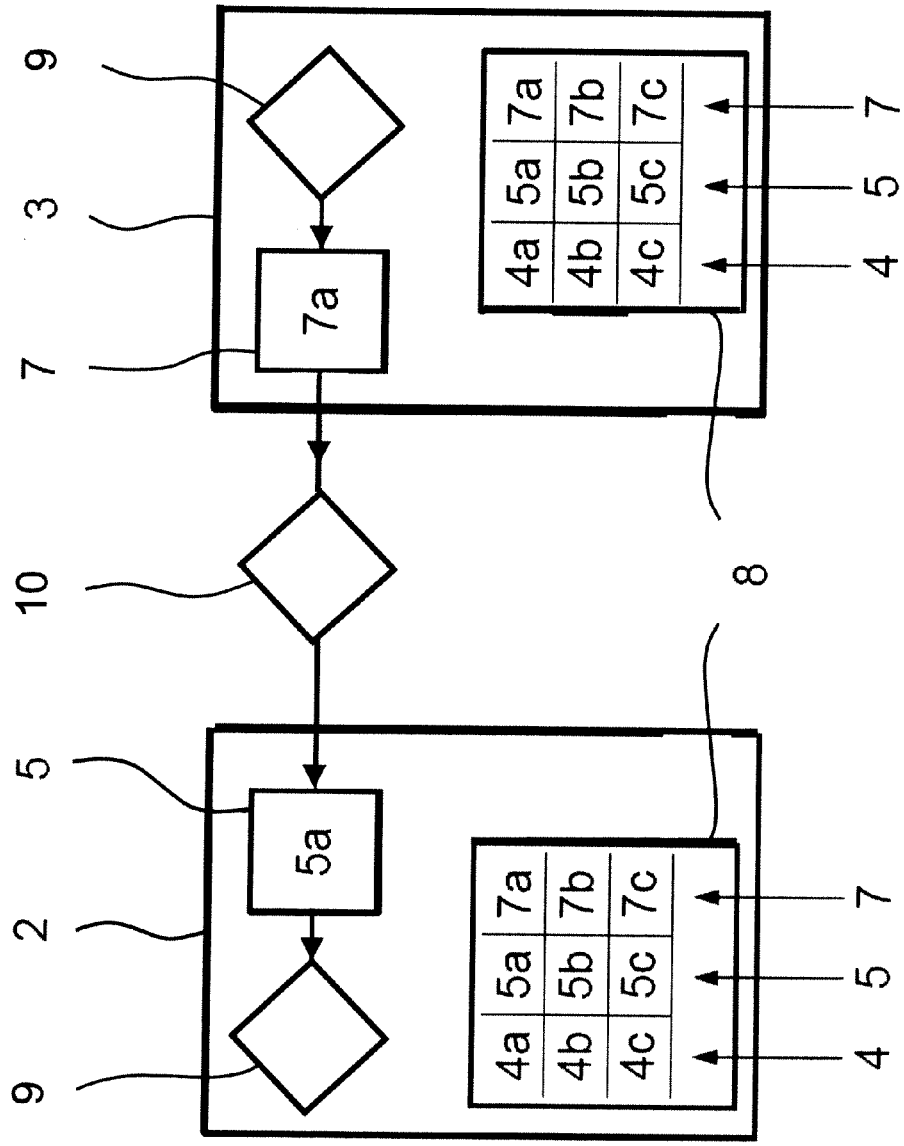

As illustrated in FIG. 3, an additional exemplary embodiment using an asymmetric encryption and decryption method is one in which the user of the contents authenticates himself when making a request 9 to acquire digital contents from the owner of the authorizations or from the first electronic work environment 2. This is accomplished by adding an electronic signature to his requests to use digital contents 1, to create a signed request 10. The signature can be obtained in a conventional fashion by using the private key—corresponding to the decryption 7—for the acquisition information. The owner of the authorizations can confirm or reject said digital signature on the first electronic work environment 2 by using the corresponding public key—corresponding to the encryption 5. If the decryption is successful, the request 9 will be available to the owner of the authorizations.

In the exemplary embodiments according to FIG. 1 to FIG. 4, the decryption 7 in the second electronic work environment 3 is additionally concealed; in this context this means that at least the decryptions 7a, 7b, and 7c assigned to the various scopes of authorizations 4a, 4b and 4c are embedded into the second electronic work environment 3 in such a way that the decryptions 7a, 7b and 7c can not easily be retrieved from the second work environment 3. In the present case, the decryption 7 is hidden in the software modules installed on the second work environment 3. This concealment can be performed by known methods of hardware and software security and obfuscation, such as the methods provided by the Trusted Computing initiative.

Figure 4:
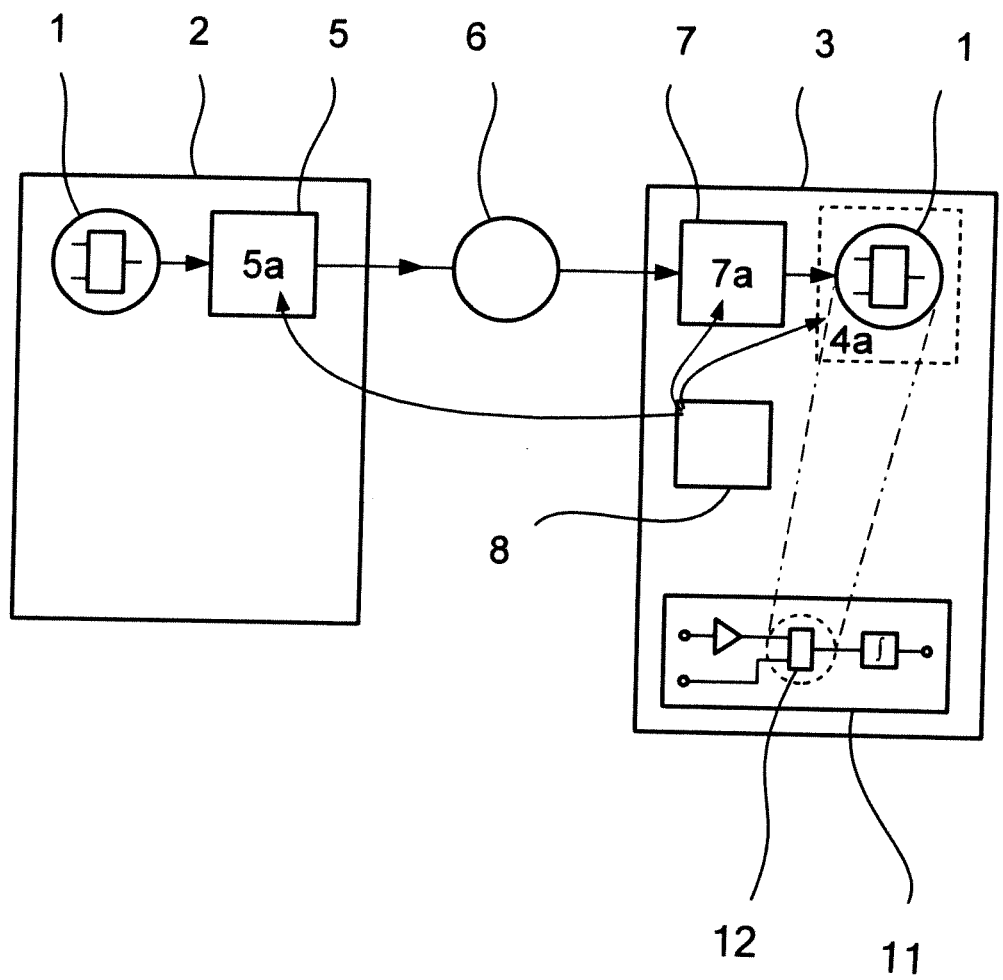
FIG. 4 shows an additional embodiment of the method of the invention.

In FIG. 4 the second work environment 3 comprises a graphic and mathematic modeling environment 11 as it is commonly used for the mathematical modeling and simulation of technical physical processes. The modeling environment 11 is a graphic modeling environment because a graphic interface is used for the mathematical modeling which is essentially based on block diagrams as they are known from the theoretical system description of technical physical associations. Accordingly, the digital contents 1 on the first electronic work environment 2 and the second electronic work environment 3 are graphic and mathematical models or model components 12, as is indicated with a block comprising two inputs and an output in FIG. 4. In the second electronic work environment 3 in FIG. 4, the reference list 8 is not illustrated in detail; in principle however, it is designed in the same way as described based on FIG. 1 and FIG. 2 above. The digital content 1 equipped with the scope of authorizations 4a in the second electronic work environment 3 is a block which can be used as model component 12 in the mathematical modeling environment 11 based on the assigned scope of authorizations 4a. Commercially available mathematical models and model components 12 are frequently the result of many years of development and model maintenance and represent technical know-how in condensed form. As a result, the owners of the authorizations have a considerable interest—be it for commercial or confidentiality reasons—to provide these models and model components 12 to the users of the contents at a limited scope of authorizations only.

Therefore, the methods for the authorization management and the systems for the authorization management illustrated in FIG. 1 to FIG. 4 provide the following scopes of authorizations 4 for use in the reference list 8 in particular for graphic and/or mathematical models and model components 12 as digital contents 1, but equally for other digital contents 1: unrestricted authorization, inheritance right, right of use, right to view and right to modify.

The work environments disclosed herein could be embodied by software and/or hardware within any known computer processing environments, or within combinations of multiple computer processing environments. These computer processing environments might include, personal computers, servers, mainframes, mobile handsets, embedded systems, PDAs, set top boxes, etc.

This disclosure shows by way of illustration various embodiments in which the claimed inventions may be practiced. The advantages and features of the disclosure are of a representative sample of embodiments only, and are not exhaustive or exclusive. They are presented only to assist in understanding and teaching the claimed principles. As such, it should be understood that the advantages, embodiments, examples, functionality, features, and/or other aspects of the disclosure are not to be considered limitations of the on the inventions as defined by the claims.

The invention claimed is:

1. A method for the authorization management of digital contents between at least one owner of an authorization with a first electronic work environment and at least one user of contents with a second electronic work environment for using the first electronic work environment to provide the digital contents to the user of the contents at a certain scope of authorization that corresponds to a level of functionality for the digital contents, such that
   the user of the contents is able to use the provided digital contents on the second electronic work environment only at the level of functionality defined by the scope of authorization comprising:
   the first electronic work environment encoding the digital contents with encryption to create encoded contents;
   exchanging the encoded contents between the first electronic work environment and the second electronic work environment;
   the second electronic work environment decoding the encoded contents to become digital contents;
   wherein the first electronic work environment or the second electronic work environment is equipped with a reference list providing a plurality of scopes of authorization, including the certain scope of authorization, each scope of authorization on the reference list having a unique associated encryption and decryption such that the encoding by first electronic work environment occurs using the encryption associated with the certain scope of authorization from the reference list, and the decoding of the encoded contents by the second electronic work environment is performed using the decryption associated with the certain scope of authorization from the reference list;
   the second electronic work environment only providing the digital contents to the user of the contents at the level of functionality defined by the scope of authorization corresponding to the decryption.

2. The method according to claim 1, wherein an asymmetrical method with private and public keys is used as encryption/decryption, and wherein a defined pair of public and private keys corresponds to the certain scope of authorization from the plurality of scopes of authorizations.

3. The method according to claim 2, wherein only the second electronic work environment is equipped with the reference list which comprises the scopes of authorization and the corresponding public and private keys.

4. The method according to claim 1 wherein at least the decryption is concealed in the second work environment in an inaccessible manner.

5. The method according to claim 1 wherein the second work environment comprises a software graphic and/or mathematical modeling environment.

6. The method according to claim 5 the digital contents comprise graphic and/or mathematical models or model components.

7. The method according to claim 1 wherein the reference list comprises one of the following scopes of authorizations unrestricted authorization, inheritance right, right of use, right to view of right to modify.

8. The method according to claim 1 further comprising the user of the second electronic work environment sending a request for the digital contents, wherein the request for digital contents is secured and authenticated using public/private key cryptography.

9. A system for the authorization management of digital contents having at least one first electronic work environment to be used by an owner of an authorization and at least one second electronic work environment to be used by a user of the contents, the first work environment assigning the digital contents a defined scope of authorization, and where the digital contents in the second work environment assigned to the defined scope of authorization can only be used at the defined scope of authorizations, comprising:
- an encryptor on the first electronic work environment that encodes the digital contents to create an encoded contents;
- a decryptor on the second electronic work environment that decodes the encoded contents to create a decoded digital contents,
- wherein, the first electronic work environment or the second electronic work environment further comprise a reference list of a plurality of scopes of authorization, including the defined scope of authorization, each scope of authorization corresponding to a level of functionality for the digital contents,
- each scope of authorization having a unique associated encryption and decryption, usable by the encryptor and decryptor, respectively, enabling the digital contents in the first electronic work environment to be encoded with the encryption corresponding to a particular scope of authorization selected from the reference list and the encoded contents are decodable by the decryption associated with the defined scope of authorization with the second electronic work environment, where the digital contents on the second electronic work environment can only be used at the scope of authorizations corresponding to the decryption and enabling the associated level of functionality.

10. The system according to claim 9, wherein the encryption on the first electronic work environment and the decryption on the second electronic work environment implement an asymmetrical encryption and decryption with private and public keys, where a defined pair of public and private keys corresponds to each of the plurality of scopes of authorizations.

11. The system according to claim 10, wherein the reference list is only recorded on the second electronic work environment, and where the reference list comprises the scopes of authorizations and the corresponding public and private keys.

12. A method for the authorization of digital contents between a first electronic work environment and a second electronic work environment, wherein the second electronic work environment comprises a computer configured for technical system modeling and the digital contents represent simulation models, comprising:
- storing a reference list in the second electronic work environment that identifies a plurality of scopes of authorizations and provides a unique decryption associated with each such scope of authorization;
- receiving an encrypted digital content at the second electronic work environment;
- decrypting the encrypted digital content at the second electronic work environment using one of the unique decryptions from the reference list to create a decrypted digital content;
- using the decrypted digital content on the second electronic work environment to simulate a technical system, wherein the use of the decrypted digital content is restricted by the scope of authorization associated with the one unique decryption on the reference list that was used for decrypting.

\* \* \* \* \*